US011698018B2

(12) United States Patent
Imai et al.

(10) Patent No.: US 11,698,018 B2
(45) Date of Patent: Jul. 11, 2023

(54) CONTROL DEVICE AND CONTROL METHOD FOR INTERNAL COMBUSTION ENGINE

(71) Applicant: TOYOTA JIDOSHA KABUSHIKI KAISHA, Aichi-ken (JP)

(72) Inventors: Sohichi Imai, Toyota (JP); Yuya Yoshikawa, Toyota (JP); Kazuhiro Hasegawa, Nagoya (JP); Yoshifumi Matsuda, Toyota (JP); Masanao Idogawa, Nagoya (JP); Takahiro Uchida, Okazaki (JP); Yuki Yabushita, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/749,147

(22) Filed: May 20, 2022

(65) Prior Publication Data

US 2022/0403767 A1 Dec. 22, 2022

(30) Foreign Application Priority Data

Jun. 22, 2021 (JP) ................. 2021-103458

(51) Int. Cl.
*F01N 11/00* (2006.01)
*F01N 9/00* (2006.01)
(Continued)

(52) U.S. Cl.
CPC .......... *F01N 11/005* (2013.01); *F01N 3/0253* (2013.01); *F01N 3/101* (2013.01);
(Continued)

(58) Field of Classification Search
CPC ....................... F01N 11/005; F01N 2900/1602
See application file for complete search history.

(56) References Cited

U.S. PATENT DOCUMENTS

2002/0139109 A1\* 10/2002 Sakanushi ........... F02D 41/0235
60/285
2011/0072788 A1\* 3/2011 Ruona .................... F02M 26/05
60/287

(Continued)

FOREIGN PATENT DOCUMENTS

JP 2010255490 A 11/2010
WO 2014122778 A1 8/2014

*Primary Examiner* — Jonathan R Matthias
(74) *Attorney, Agent, or Firm* — Hauptman Ham, LLP

(57) ABSTRACT

A control device for an internal combustion engine including an upstream cleaning device and a downstream cleaning device that are provided in an exhaust gas passage and a temperature sensor that detects a temperature of exhaust gas between the upstream cleaning device and the downstream cleaning device is provided. The control device includes a first temperature estimating unit configured to estimate a temperature of the downstream cleaning device from the temperature of exhaust gas detected by the temperature sensor and a second temperature estimating unit configured to estimate a temperature of the downstream cleaning device without using the temperature of exhaust gas detected by the temperature sensor. An abnormality determining process for the upstream cleaning device is performed when at least the temperature of the downstream cleaning device estimated by the second temperature estimating unit is equal to or greater than a predetermined threshold value.

5 Claims, 5 Drawing Sheets

(51) Int. Cl.
  *F01N 3/10* (2006.01)
  *F01N 3/025* (2006.01)

(52) U.S. Cl.
  CPC ............ *F01N 9/002* (2013.01); *F01N 11/007* (2013.01); *F01N 2900/1402* (2013.01); *F01N 2900/1404* (2013.01); *F01N 2900/1602* (2013.01)

(56) References Cited

U.S. PATENT DOCUMENTS

| | | | |
|---|---|---|---|
| 2012/0085084 A1* | 4/2012 | Bisaiji | F01N 11/007 60/276 |
| 2015/0369153 A1 | 12/2015 | Tsunooka et al. | |
| 2020/0332731 A1* | 10/2020 | Muto | F02D 41/0295 |

* cited by examiner

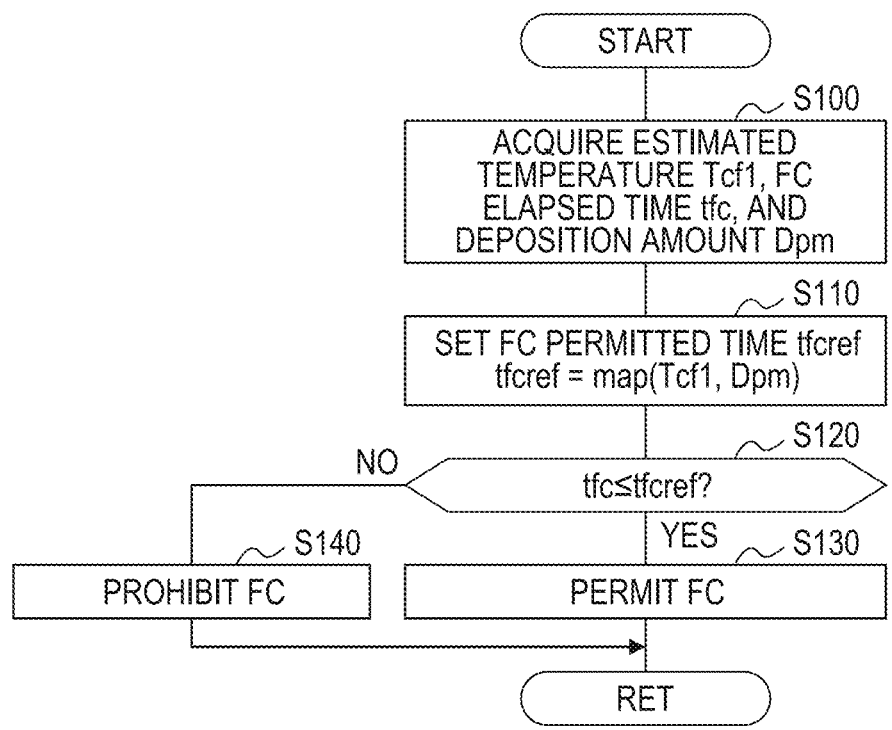

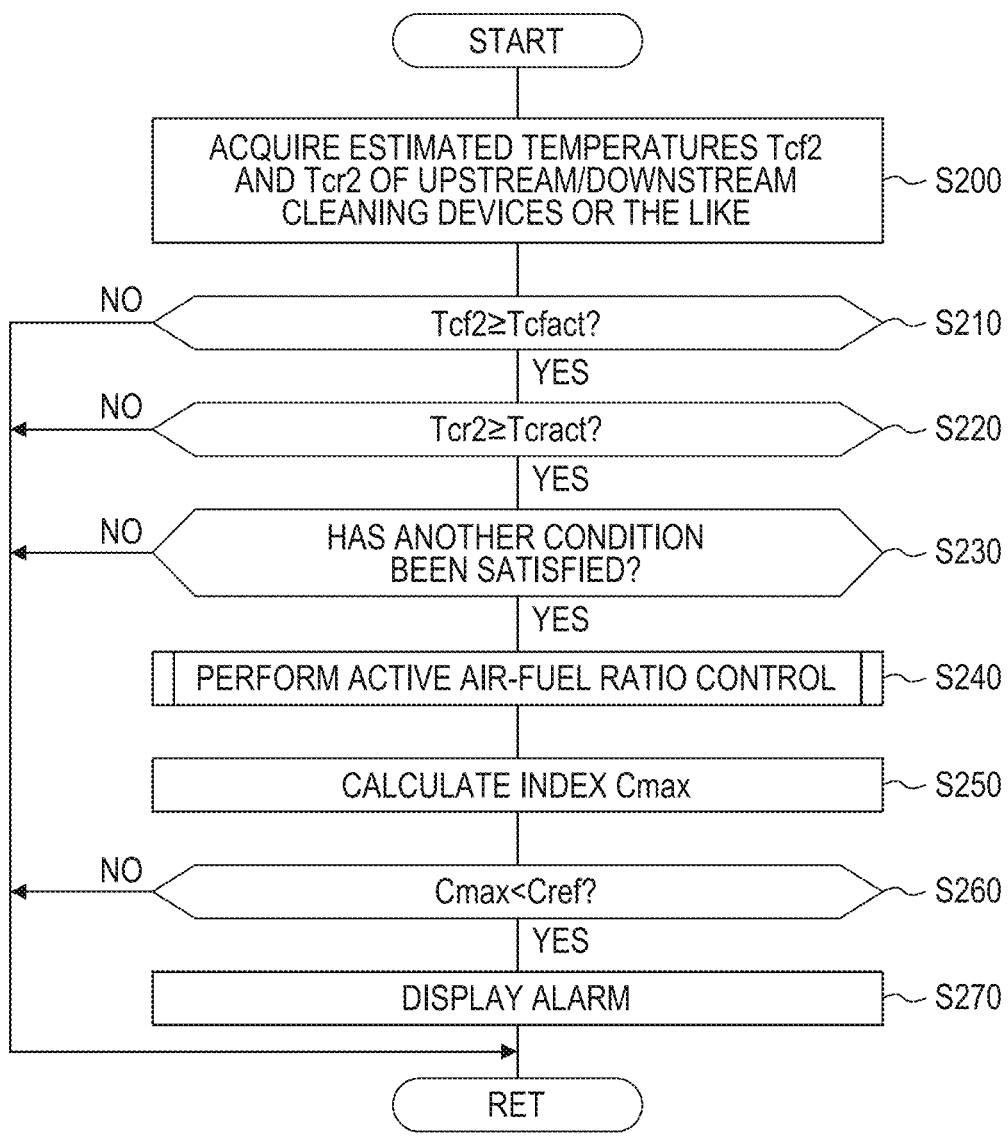

CONTROL DEVICE AND CONTROL METHOD FOR INTERNAL COMBUSTION ENGINE

CROSS-REFERENCE TO RELATED APPLICATION

This application claims priority to Japanese Patent Application No. 2021-103458 filed on Jun. 22, 2021, incorporated herein by reference in its entirety.

BACKGROUND

1. Technical Field

The present disclosure relates to a control device and a control method for an internal combustion engine including an upstream cleaning device and a downstream cleaning device which are provided in an exhaust gas passage.

2. Description of Related Art

An internal combustion engine including a catalyst (an upstream cleaning device) that is provided in an exhaust gas passage, a filter (a downstream cleaning device) that collects particulate matter (PM) in exhaust gas downstream from the catalyst, and a control device that prohibits fuel cut-off when thermal deterioration of the catalyst is predicted to have progressed by performing fuel cut-off is known in the related art (for example, see WO 2014/122778). When regeneration of the filter is necessary and a temperature of the filter acquired from a detection value from a temperature sensor provided between the catalyst and the filter in the exhaust gas passage is equal to or higher than a temperature at which particulate matter can be removed, the control device for an internal combustion engine performs fuel cut-off of stopping supply of fuel to a combustion chamber even if thermal deterioration of the catalyst is predicted to have progressed. Accordingly, by performing fuel cut-off, a lot of oxygen can be supplied into the filter to combust particulate matter, whereby it is possible to regenerate the filter.

In order to diagnose an abnormality of a catalyst provided in an exhaust gas passage of an internal combustion engine, a catalyst abnormality diagnosing device that performs active air-fuel ratio control of alternately switching an air-fuel ratio of exhaust gas supplied to the catalyst to a rich side or a lean side in response to change (inversion) of an air-fuel ratio of exhaust gas downstream from the catalyst to the rich side or the lean side is known in the related art (for example, see WO 2014/122778). When a catalyst temperature (an estimated temperature) is in an active temperature range, the catalyst abnormality diagnosing device performs the active air-fuel ratio control and determines whether an abnormality occurs in the catalyst based on an amount of oxygen stored in the catalyst which is estimated while the active air-fuel ratio control is being performed.

SUMMARY

In the internal combustion engine described in WO 2014/122778, since the temperature of the filter can be accurately estimated based on the detection value from the temperature sensor provided between the catalyst and the filter in the exhaust gas passage, it is possible to maintain particulate matter collection performance by appropriately performing a process of regenerating the filter according to the temperature of the filter. On the other hand, in the internal combustion engine described in WO 2014/122778, when it is determined whether an abnormality occurs in the catalyst provided upstream from the filter, active air-fuel ratio control described in Japanese Unexamined Patent Application Publication No. 2010-255490 needs to be performed in a state in which both the upstream catalyst and a catalyst carried in the downstream filter are activated in order to curb deterioration of emissions. However, when whether the catalyst carried in the filter is activated (whether the catalyst temperature is equal to or higher than an activation temperature) is determined based on the temperature of the filter estimated from the detection value from the temperature sensor, it was proved that an opportunity to perform the active air-fuel ratio control could not be satisfactorily secured.

Therefore, the present disclosure provides a technique of enabling appropriate determining of an abnormality in an upstream cleaning device in an internal combustion engine including the upstream cleaning device and a downstream cleaning device which are provided in an exhaust gas passage.

A control device for an internal combustion engine according to the present disclosure is a control device for an internal combustion engine including an upstream cleaning device and a downstream cleaning device that are provided in an exhaust gas passage and a temperature sensor that detects a temperature of exhaust gas between the upstream cleaning device and the downstream cleaning device, the control device including: a first temperature estimating unit configured to estimate a temperature of the downstream cleaning device from the temperature of exhaust gas detected by the temperature sensor; and a second temperature estimating unit configured to estimate a temperature of the downstream cleaning device without using the temperature of exhaust gas detected by the temperature sensor, wherein an abnormality determining process for the upstream cleaning device is performed when at least the temperature of the downstream cleaning device estimated by the second temperature estimating unit is equal to or greater than a predetermined threshold value.

The control device for an internal combustion engine according to the present disclosure includes the first temperature estimating unit configured to estimate the temperature of the downstream cleaning device from the temperature of exhaust gas between the upstream cleaning device and the downstream cleaning device detected by the temperature sensor. Accordingly, it is possible to appropriately ascertain a state or the like of the downstream cleaning device based on the temperature which is accurately estimated from a temperature actually measured at a position relatively close to the downstream cleaning device by the first temperature estimating unit. When the upstream cleaning device has deteriorated, the temperature of the upstream cleaning device is lower than that when the upstream cleaning device has not deteriorated, and thus the temperature of exhaust gas detected (measured) by the temperature sensor between the upstream cleaning device and the downstream cleaning device decreases. As a result, when whether the abnormality determining process for the upstream cleaning device is to be performed is determined based on the temperature of the downstream cleaning device which is estimated from the temperature of exhaust gas detected by the temperature sensor by the first temperature estimating unit, it is conceivable that the downstream cleaning device may not be activated though an abnormality has occurred in the upstream cleaning device and there is concern about the abnormality determining process not being performed. In consideration of this situation, the second temperature estimating unit configured to estimate the temperature of the downstream cleaning device without using the temperature of exhaust gas detected by the temperature sensor is provided in the control device for the internal combustion engine according to the present disclosure, and the control device performs the abnormality determining process for the upstream cleaning device using an execution condition that the temperature of the downstream cleaning device estimated by the second temperature estimating unit is equal to or greater than the predetermined threshold value. Accordingly, since whether the abnormality determining process for the upstream cleaning device is to be performed can be determined based on the estimated temperature of the downstream cleaning device in which deterioration of the upstream cleaning device is not reflected, it is possible to satisfactorily secure opportunities to perform the abnormality determining process and to reliably ascertain the state of the upstream cleaning device. As a result, with the control device for the internal combustion engine according to the present disclosure, it is possible to appropriately determine whether an abnormality has occurred in the upstream cleaning device. The control device for the internal combustion engine according to the present disclosure may determine the state of the downstream cleaning device based on the temperature of the downstream cleaning device estimated by the first temperature estimating unit.

The second temperature estimating unit may be configured to estimate a temperature of the upstream cleaning device without using the temperature of exhaust gas detected by the temperature sensor. The control device may perform the abnormality determining process for the upstream cleaning device based on the premise that the temperature of the upstream cleaning device estimated by the second temperature estimating unit is equal to or higher than a predetermined first lower-limit temperature and the temperature of the downstream cleaning device estimated by the second temperature estimating unit is equal to or higher than a second lower-limit temperature which is the threshold value. Accordingly, it is possible to prevent execution conditions of the abnormality determining process from not being satisfied due to deterioration of the upstream cleaning device and to satisfactorily secure opportunities to perform the abnormality determining process.

The second temperature estimating unit may be configured to estimate the temperatures of the upstream cleaning device and the downstream cleaning device based on a temperature of exhaust gas flowing out of an exhaust port of the internal combustion engine, an amount of heat transmitted between exhaust gas and an exhaust pipe, and an amount of heat discharged from the exhaust pipe. Accordingly, since whether the abnormality determining process for the upstream cleaning device is to be performed can be determined based on the temperatures of the upstream cleaning device and the downstream cleaning device which are estimated based on the premise that the upstream cleaning device has not deteriorated, it is possible to satisfactorily secure opportunities to perform the abnormality determining process.

The internal combustion engine may further include a supercharger including a turbine wheel that is provided in the exhaust gas passage and a compressor wheel that is connected to the turbine wheel via a turbine shaft and provided in an intake air passage of the internal combustion engine. The second temperature estimating unit may be configured to estimate the temperature of the upstream cleaning device based on a temperature of exhaust gas flowing out of the turbine wheel estimated based on the temperature of exhaust gas flowing out of the exhaust port, an amount of heat transmitted between exhaust gas and the exhaust pipe from the turbine wheel to the upstream cleaning device, and the amount of heat discharged from the exhaust pipe and may be configured to estimate the temperature of the downstream cleaning device based on the estimated temperature of the upstream cleaning device, an amount of heat transmitted between exhaust gas and the exhaust pipe from the upstream cleaning device to the downstream cleaning device, and the amount of heat discharged from the exhaust pipe. Accordingly, in the internal combustion engine including the supercharger, it is possible to satisfactorily secure opportunities to perform the abnormality determining process for the upstream cleaning device.

The internal combustion engine may further include an air-fuel ratio sensor that detects an air-fuel ratio of exhaust gas between the upstream cleaning device and the downstream cleaning device. The abnormality determining process may be active air-fuel ratio control for forcibly and alternately switching an air-fuel ratio of exhaust gas flowing into the upstream cleaning device to a rich side or a lean side with change of the air-fuel ratio detected by the air-fuel ratio sensor to the lean side or the rich side. The control device may estimate an amount of oxygen stored and an amount of oxygen discharged by the upstream cleaning device while the active air-fuel ratio control is being performed and determine whether an abnormality in the upstream cleaning device occurs based on the estimated amount of stored oxygen and the estimated amount of discharged oxygen.

The upstream cleaning device may include a three-way catalyst. The downstream cleaning device may include a particulate filter. The control device may determine whether fuel cut-off for regenerating the downstream cleaning device is to be performed based on the temperature estimated by the first temperature estimating unit. Accordingly, it is possible to reliably curb clogging of the particulate filter while curbing overheating of the downstream cleaning device and to appropriately determine whether an abnormality has occurred in the upstream cleaning device, that is, the three-way catalyst.

A control method for an internal combustion engine according to the present disclosure is a control method for an internal combustion engine including an upstream cleaning device and a downstream cleaning device that are provided in an exhaust gas passage and a temperature sensor that detects a temperature of exhaust gas between the upstream cleaning device and the downstream cleaning device, the control method including performing an abnormality determining process for the upstream cleaning device when at least the temperature of downstream cleaning device estimated without using the temperature of exhaust gas detected by the temperature sensor is equal to or greater than a predetermined threshold value.

With this method, it is possible to appropriately perform both of determining the state of the downstream cleaning device and determining an abnormality of the upstream cleaning device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating a routine for determining whether fuel cut-off is to be permitted that is performed by the control device for the internal combustion engine according to the present disclosure; and FIG. 6 is a flowchart illustrating an abnormality determining routine that is performed to determine whether an abnormality occurs in the upstream cleaning device by the control device for the internal combustion engine according to the present disclosure.

DETAILED DESCRIPTION OF EMBODIMENTS

Hereinafter, an embodiment of the present disclosure will be described with reference to the accompanying drawings.

Figure 1:
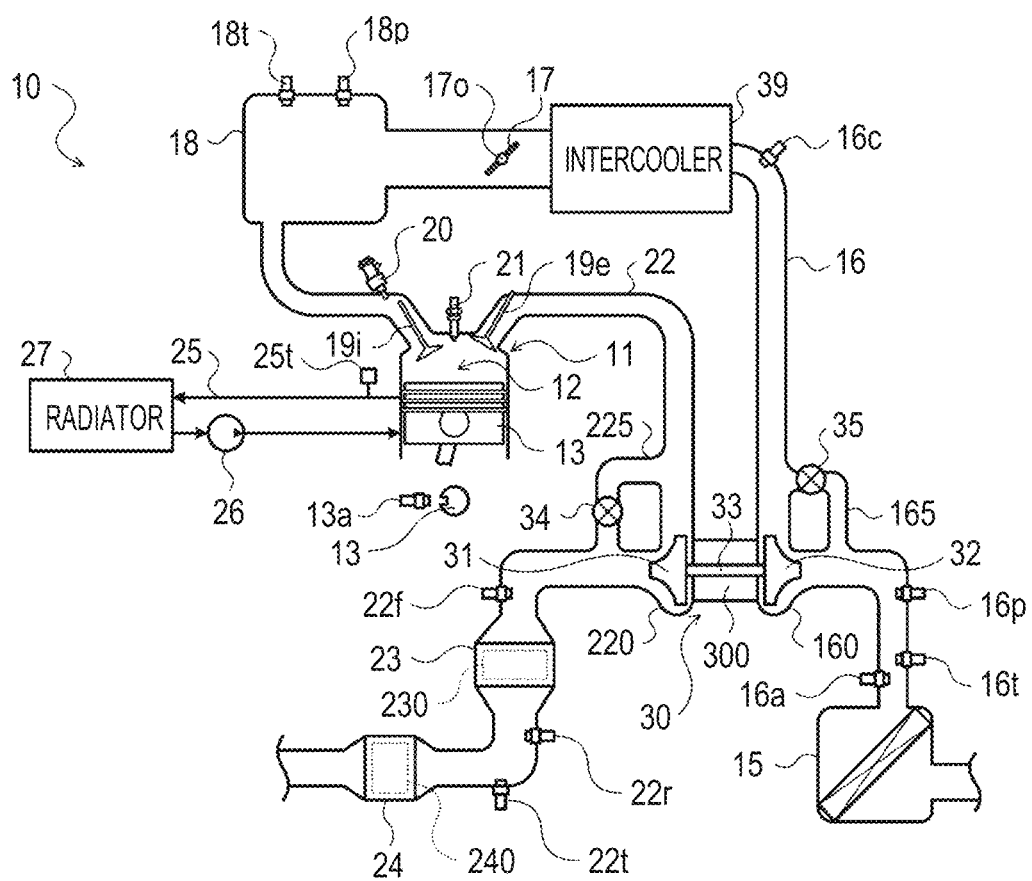
FIG. 1 is a diagram schematically illustrating a configuration of an internal combustion engine that is controlled by a control device according to the present disclosure.

FIG. 1 is a diagram schematically illustrating a configuration of an engine 10 which is an internal combustion engine that is controlled by an engine electronic control unit (hereinafter referred to as an "engine ECU") 100 which is a control device according to the present disclosure. The engine 10 illustrated in the drawing is, for example, a tandem gasoline engine that converts a translational motion of a piston 13 with combustion of a mixture of hydrocarbon-based fuel and air in a plurality of combustion chambers 12 formed in an engine block 11 to a rotational motion of a crank shaft (an output shaft) 14, and is mounted in a vehicle. As illustrated in FIG. 1, the engine 10 includes an air cleaner 15, an intake pipe 16, an electronically controlled throttle valve 17, a surge tank 18, a plurality of intake valves 19$i$ that opens or closes a corresponding intake port, an exhaust valve 19$e$ that opens or closes a corresponding exhaust port, a plurality of fuel injection valves 20, a plurality of spark plugs 21, and an exhaust pipe 22 that forms an exhaust gas passage in addition to the engine block 11, the plurality of combustion chambers 12, pistons 13, and the crank shaft 14. Each fuel injection valve 20 may inject fuel into the intake port as illustrated in the drawing or may directly inject fuel into the combustion chamber 12. Both a port injection valve and a cylinder injection valve may be provided in the engine 10.

The engine 10 includes an upstream cleaning device 23 and a downstream cleaning device 24 assembled to an exhaust pipe 22 as an exhaust gas cleaning device. The upstream cleaning device 23 includes an NOx storage type exhaust gas cleaning catalyst (a three-way catalyst) 230 that removes toxic components such as CO (carbon monoxide), HC, and NOx in exhaust gas from the combustion chambers 12 of the engine 10. The downstream cleaning device 24 includes a particulate filter (GPF) 240 that collects particulate matter (particulates) in exhaust gas and is provided downstream from the upstream cleaning device 23. In this embodiment, a particulate filter 240 is a porous filter carrying an NOx storage type exhaust gas cleaning catalyst (a three-way catalyst). That is, the downstream cleaning device 24 is configured as a four-way catalyst having a cleaning function of a three-way catalyst and a particulate matter collecting function.

The engine 10 includes a coolant circulation passage 25 for cooling the engine block 11 and the like, an electrical pump 26, and a radiator 27. The electrical pump 26 circulates a coolant (LLC) in the coolant circulation passage 25. The radiator 27 cools a coolant having absorbed heat from the engine block 11 and the like through exchange of heat with travel wind or air from an electrical fan which is not illustrated. A coolant temperature sensor 25$t$ is provided in the coolant circulation passage 25. The coolant temperature sensor 25$t$ detects a coolant temperature Tw of a coolant having absorbed heat (flowing out) from the engine block 11.

The engine 10 includes a supercharger 30 that compresses intake air using energy of exhaust gas and a liquid-cooling intercooler 39 that cools air compressed by the supercharger 30. As illustrated in FIG. 1, the supercharger 30 is a turbo charger including a turbine wheel 31, a compressor wheel 32, a turbine shaft 33 that connects the turbine wheel 31 and the compressor wheel 32 as a unified member, a waste gate valve 34, and a blow-off valve 35. The turbine wheel 31 is rotatably disposed in a turbine housing 220 which is formed in the exhaust pipe 22 such that it is located upstream from the upstream cleaning device 23. The compressor wheel 32 is rotatably disposed in a compressor housing 160 which is formed in the intake pipe 16 such that it is located between the air cleaner 15 and the throttle valve 17.

The turbine shaft 33 is rotatably disposed in a bearing housing 300 which is fixed between the turbine housing 220 and the compressor housing 160. The bearing housing 300 holds bearings (not illustrated) therein and rotatably supports the turbine shaft 33 via the bearings. In the bearing housing 300, an oil passage in which a lubricant for lubricating and cooling the turbine shaft 33, the bearings, and the like flows and a coolant passage for cooling the inside of the bearing housing 300 are formed (both of which are not illustrated). The oil passage in the bearing housing 300 is supplied with a work hybrid which is a lubricant from a hydraulic pressure control device (not illustrated) that control the work fluid from a mechanical oil pump (not illustrated) driven by the engine 10. The coolant passage in the bearing housing 300 is supplied with a coolant from a cooling system (not illustrated) that circulates the coolant in the intercooler 39.

The waste gate valve 34 of the supercharger 30 is a flow control vale and is provided in a bypass pipe 225 connected to the exhaust pipe 22 such that it bypasses the turbine housing 220 (the turbine wheel 31) as illustrated in FIG. 1. A ratio between an amount of exhaust gas flowing in a bypass pipe 165 and an amount of exhaust gas rotating the turbine wheel 31 and the compressor wheel 32 can be changed by adjusting an opening level of the waste gate valve 34. That is, a supercharging pressure Pc of the supercharger 30 in the engine 10 can be adjusted by adjusting the opening level of the waste gate valve 34. Compression of intake air in the supercharger 30 (the compressor wheel 32) can be substantially stopped by fully opening the waste gate valve 34.

The blow-off valve 35 of the supercharger 30 is provided in the bypass pipe 165 connected to the intake pipe 16 such that it bypasses the compressor housing 160 (the compressor wheel 32) as illustrated in FIG. 1. A pressure (surplus pressure) in the intake pipe 16 between the compressor wheel 32 and the throttle valve 17 can be released by opening the blow-off valve 35. Accordingly, it is possible to curb deterioration in responsiveness of the throttle valve 17 and occurrence of surging. The blow-off valve 35 may be a check valve that is opened when a pressure downstream from the compressor wheel 32 is higher by a predetermined value than a pressure upstream therefrom.

Figure 2:
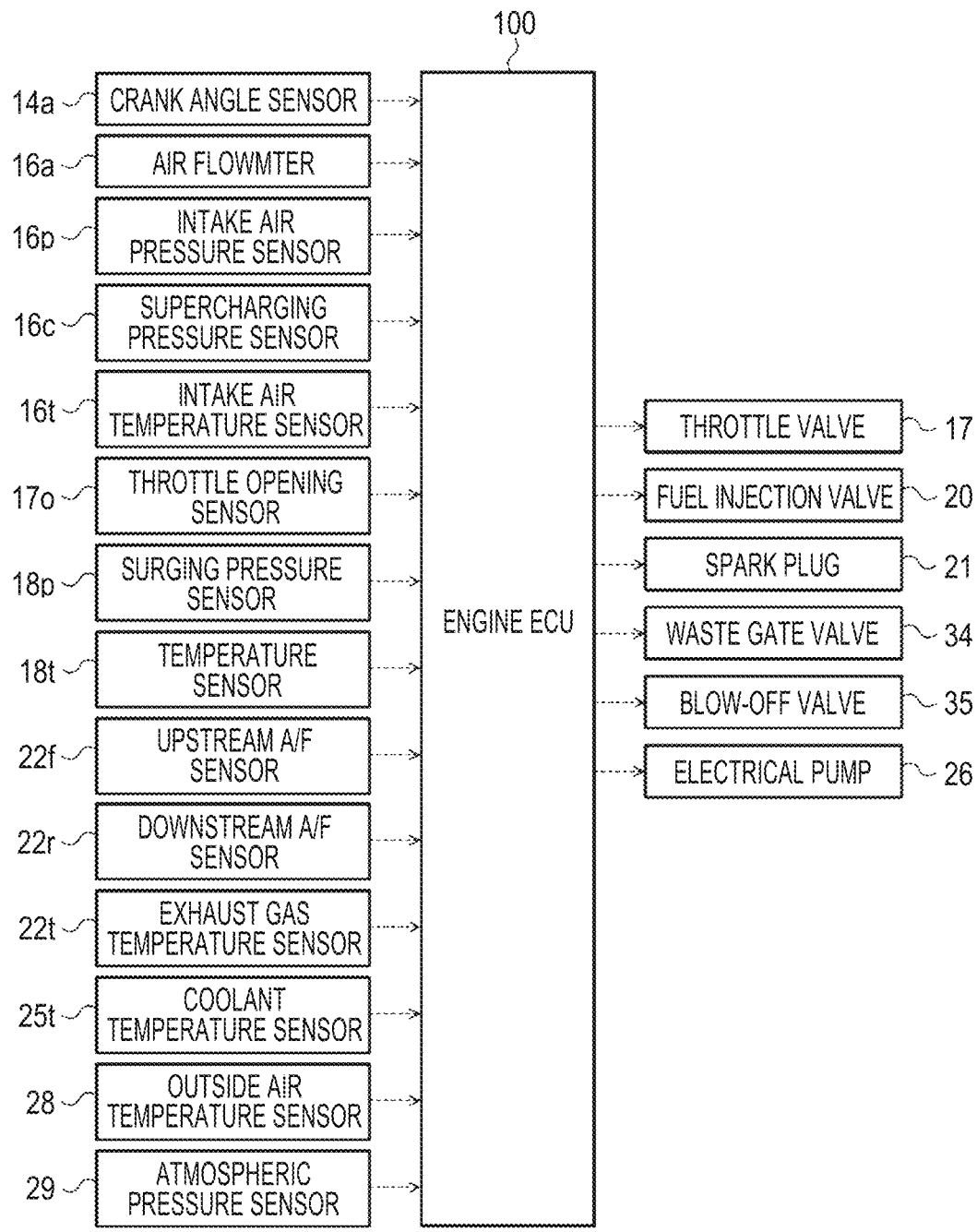
FIG. 2 is a block diagram illustrating the control device for the internal combustion engine according to the present disclosure.

An engine ECU 100 that controls the engine 10 includes a microcomputer including a CPU, a ROM, a RAM, and an input/output interface, various drive circuits, and various logic ICs which are not illustrated. As illustrated in FIG. 2, the engine ECU 100 acquires detection values from a crank angle sensor 14a, an air flowmeter 16a, an intake air pressure sensor 16p, a supercharging pressure sensor 16c, an intake air temperature sensor 16t, a throttle opening sensor 17o, a surging pressure sensor 18p, a temperature sensor 18t, an upstream air-fuel ratio sensor 22f, a downstream air-fuel ratio sensor 22r, an exhaust gas temperature sensor 22t, a coolant temperature sensor 25t, an outside air temperature sensor 28, and an atmospheric pressure sensor 29 via the input port which is not illustrated.

The crank angle sensor 14a detects a rotational position (a crank position) of the crank shaft 14. The air flowmeter 16a detects an amount of intake air Qa in the intake pipe 16 upstream from the compressor wheel 32. The intake air pressure sensor 16p detects an intake air pressure Pin in the intake pipe 16 upstream from the compressor wheel 32. The intake air temperature sensor 16t detects an intake air temperature Tin in the intake pipe 16 upstream from the compressor wheel 32. The supercharging pressure sensor 16c detects a supercharging pressure Pc which is a pressure of air compressed by the compressor wheel 32 in the intake pipe 16 between the compressor housing 160 and the intercooler 39. The throttle opening sensor 17o detects an opening level TH of the throttle valve 17. The surging pressure sensor 18p detects a surging pressure Ps which is a pressure of air in the surge tank 18. The temperature sensor 18t detects a surge temperature Ts which is a temperature of air in the surge tank 18. The upstream air-fuel ratio sensor 22f detects an upstream air-fuel ratio AFf which is an air-fuel ratio of exhaust gas flowing into the upstream cleaning device 23 from the upstream side of the upstream cleaning device 23. The downstream air-fuel ratio sensor 22r detects a downstream air-fuel ratio AFr which is an air-fuel ratio of exhaust gas flowing into the downstream cleaning device 24 from the downstream side of the upstream cleaning device 23. The exhaust gas temperature sensor 22t detects a temperature Teg of exhaust gas flowing in a part of the exhaust pipe 22 between the upstream cleaning device 23 and the downstream cleaning device 24.

The engine ECU 100 calculates a rotation speed Ne of the engine 10 (the crank shaft 14) based on the crank position from the crank angle sensor 14a, and calculates a load factor KL based on the amount of intake air Qa from the air flowmeter 16a and the rotation speed Ne of the engine 10. The load factor KL is a ratio of a volume of air actually taken in one cycle to a stroke volume for each cycle of the engine 10. The engine ECU 100 controls the throttle valve 17, the plurality of fuel injection valves 20, the plurality of spark plugs 21, and the like based on the rotation speed Ne, the load factor KL, or the like. The engine ECU 100 controls the waste gate valve 34 and the blow-off valve 35 of the supercharger 30, the electrical pump 26, an electrical pump (not illustrated) included in a cooling system of the supercharger 30, and the like.

Figure 3:
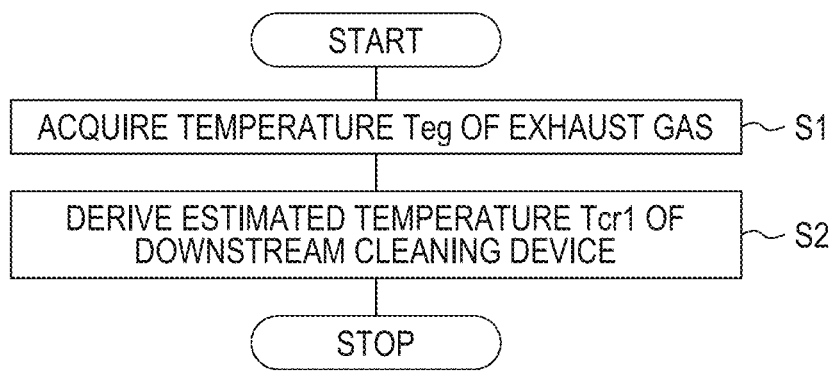
FIG. 3 is a flowchart illustrating a routine for estimating a temperature of a downstream cleaning device which is performed by the control device for the internal combustion engine according to the present disclosure.

The engine ECU 100 derives an estimated temperature (an estimated floor temperature) Tcr1 of the downstream cleaning device 24 (the particulate filter 240) by repeatedly performing the routine illustrated in FIG. 3 at intervals of a predetermined time (minute time) while a system of the vehicle in which the engine 10 is mounted is operating. When the routine illustrated in FIG. 3 is started, the engine ECU 100 acquires the temperature Teg of exhaust gas detected by the exhaust gas temperature sensor 22t (Step S1). The engine ECU 100 derives a newest estimated temperature Tcr1 of the downstream cleaning device 24 based on the acquired temperature Teg (Step S2) and temporarily ends the routine illustrated in FIG. 3. In Step S2, the engine ECU 100 estimates a temperature of a front end or a central part of the downstream cleaning device 24, that is, the particulate filter 240, based on the temperature Teg of exhaust gas, an amount of heat transmitted between a part of the exhaust pipe 22 between the upstream cleaning device 23 and the downstream cleaning device 24 and exhaust gas, an amount of heat discharged from a part of the exhaust pipe 22 between the upstream cleaning device 23 and the downstream cleaning device 24, and the like and stores the estimated temperature as the newest estimated temperature Tcr1 of the downstream cleaning device 24 in the RAM.

Figure 4:
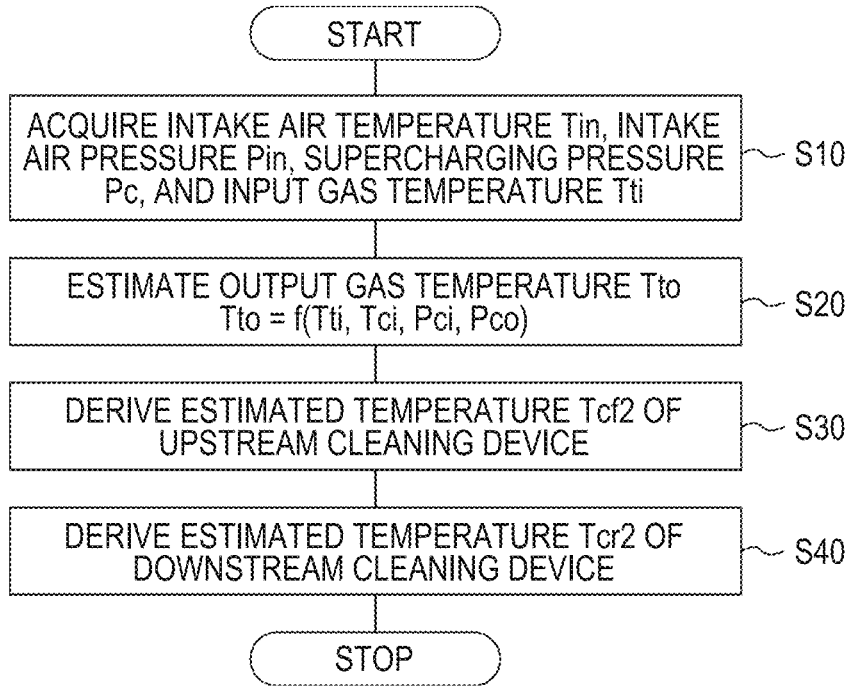
FIG. 4 is a flowchart illustrating a routine for estimating temperatures of an upstream cleaning device and a downstream cleaning device that is performed by the control device for the internal combustion engine according to the present disclosure.

By repeatedly performing the routine illustrated in FIG. 4 at intervals of a predetermined time (a minute time) while the system of the vehicle in which the engine 10 is mounted is operating, the engine ECU 100 derives an estimated temperature (estimated floor temperature) Tcf2 of the upstream cleaning device 23, that is, an exhaust gas cleaning catalyst 230, and an estimated temperature (estimated floor temperature) Tcr2 of the downstream cleaning device 24, that is, the particulate filter 240. When the routine illustrated in FIG. 4 is started, the engine ECU 100 acquires data required for estimating a temperature such as the intake air temperature Tin detected by the intake air temperature sensor 16t, the intake air pressure Pin (absolute pressure) detected by the intake air pressure sensor 16p, the supercharging pressure Pc (absolute pressure) detected by the supercharging pressure sensor 16c, and an input gas temperature Tti which is the temperature of exhaust gas flowing from a plurality of exhaust ports and flowing into the turbine housing 220 (the turbine wheel 31) (Step S10). The input gas temperature Tti is separately estimated based on the rotation speed Ne, the load factor KL, the upstream air-fuel ratio AFf, and the like of the engine 10.

After the process of Step S10, the engine ECU 100 estimates (calculates) an output gas temperature Tto which is the temperature of exhaust gas flowing downstream from the turbine housing 220 (the turbine wheel 31) using Expression (1) (Step S20). In Expression (1), "Tti" is the input gas temperature Tti acquired in Step S200. In Expression (1), "Tci" is a temperature of air flowing into the compressor housing 160 (the compressor wheel 32) and the intake air temperature Tin acquired in Step S200 is used as the temperature Tei in this embodiment. The outside air temperature Tout detected by the outside air temperature sensor 28 may be used as the temperature Tci. In Expression (1), "Pci" is a pressure of air flowing into the compressor housing 160, and the intake air pressure Pin (absolute pressure) acquired in Step S200 is used as the pressure Pci in this embodiment. The atmospheric pressure Pout detected by the atmospheric pressure sensor 29 may be used as the pressure Pci. In Expression (1), "Pco" is a pressure of air (compressed air) sent from the compressor wheel 32, and the supercharging pressure Pc (absolute pressure) acquired in Step S200 is used as the pressure Pco in this embodiment. In Expression (1), "Kie" is the specific heat ratio of intake air and exhaust gas of the engine 10.

$$Tto = Tti + Tci \times \left\{ 1 - \left[\frac{Pco}{Pci}\right]^{\frac{Kie-1}{Kie}} \right\} \quad (1)$$

Expression (1) is derived through the following procedure. That is, work W of an ideal gas when the ideal gas changes adiabatically from a state (P1, Vi, T1) to a state (P2, V2, T2) can be expressed by Expressions (2), (3), and (4) using Poisson's rule and a gas state equation. In Expression (3), when T1=Tci, P1=Pci, P2=Pco, and K=Ki (where "Ki" is a specific heat ratio of intake air) are set, work in which energy is consumed (compression work) We by the compressor wheel 32 is obtained. In Expression (4), when T1=Tti, T2=Tto, and K=Ke (where "Ke" is a specific heat ratio of exhaust gas) are set, work in which energy is recovered (expansion work) Wt by the turbine wheel 31 is obtained.

$$W = \frac{n \times R \times T1}{K-1} \times \left\{ 1 - \left[\frac{V1}{V2}\right]^{K-1} \right\} \quad (2)$$

$$W = \frac{n \times R \times T1}{K-1} \times \left\{ 1 - \left[\frac{P2}{P1}\right]^{\frac{K-1}{K}} \right\} \quad (3)$$

$$W = \frac{n \times R \times T1}{K-1} \times \left\{ 1 - \left[\frac{T2}{T1}\right] \right\} \quad (4)$$

When it is assumed that transmission efficiency between the turbine wheel 31 and the compressor wheel 32 is 100%, the consumption work We by the compressor wheel 32 and the recovery work Wt by the turbine wheel 31 are the same, Expression (3)=Expression (4) is satisfied, and thus Expression (5) is obtained. When it is assumed for the purpose of simplification that adiabatic efficiency 100% and Ki=Ke are satisfied, Expression (6) is obtained and Expression (1) is obtained by rearranging Expression (6). By using Expression (1) derived in this way, it is possible to more appropriately estimate the output gas temperature Tto of the turbine wheel 31.

$$-\frac{n \times R \times Tci}{Ki-1} \times \left\{ 1 - \left[\frac{Pco}{Pci}\right]^{\frac{Ki-1}{Ki}} \right\} = \frac{n \times R \times Tti}{Ke-1} \times \left\{ 1 - \left[\frac{Tto}{Tti}\right] \right\} \quad (5)$$

$$-Tci \times \left\{ 1 - \left[\frac{Pco}{Pci}\right]^{\frac{Kie-1}{Kie}} \right\} = Tti - Tto \quad (6)$$

Subsequently, the engine ECU 100 estimates a temperature of a front end or a central part of the upstream cleaning device 23, that is, the exhaust gas cleaning catalyst 230, based on the estimated output gas temperature Tto of the turbine wheel 31, an amount of heat transmitted between a part of the exhaust pipe 22 between the turbine wheel 31 and the upstream cleaning device 23 and exhaust gas, an amount of heat discharged from a part of the exhaust pipe 22 between the turbine wheel 31 and the upstream cleaning device 23, and the like and stores the estimated temperature as the newest estimated temperature Tcf2 of the upstream cleaning device 23 in the RAM (Step S30). The engine ECU 100 estimates a temperature of a front end or a central part of the downstream cleaning device 24, that is, the particulate filter 240, based on the estimated temperature Tcf2 of the upstream cleaning device 23, an amount of heat transmitted between a part of the exhaust pipe 22 between the upstream cleaning device 23 and the downstream cleaning device 24 and exhaust gas, an amount of heat discharged from a part of the exhaust pipe 22 between the upstream cleaning device 23 and the downstream cleaning device 24, and the like, stores the estimated temperature as the newest estimated temperature Tcr2 of the downstream cleaning device 24 in the RAM (Step S40), and temporarily ends the routine illustrated in FIG. 3.

In the engine 10 including the downstream cleaning device 24, that is, the particulate filter 240, it is necessary to send a lot of air, that is, oxygen, to the particulate filter 240 to combust particulate matter in a stage in which an amount of particulate matter Dpm deposited in the particulate filter 240 has increased. On the other hand, when the particulate filter 240 is regenerated, there is concern of the particulate filter 240 being overheated by reaction heat of particulate matter. Accordingly, in the vehicle in which the engine 10 is mounted, when fuel cut-off execution conditions including a condition in which depression of an accelerator pedal of the vehicle is released is satisfied, a fuel cut-off permission routine illustrated in FIG. 5 is repeatedly performed at intervals of a predetermined time (a minute time) by the engine ECU 100 in order to regenerate the particulate filter 240 by combusting particulate matter while curbing overheating of the particulate filter 240.

When the routine illustrated in FIG. 5 is started, the engine ECU 100 acquires data required for control such as the estimated temperature Tcr1 of the downstream cleaning device 24 (particulate filter 240) estimated based on the temperature Teg of exhaust gas detected by the exhaust gas temperature sensor 22t, a fuel cut-off elapsed time (FC elapsed time) tfc, and an amount of particulate matter Dpm deposited in the particulate filter 240 (Step S100). The fuel cut-off elapsed time (FC elapsed time) tfc is an elapsed time after execution of fuel cut-off has been started, is counted by a timer which is not illustrated, and is reset with stop of fuel cut-off. The amount of deposited particulate matter Dpm is separately calculated by integrating an amount of particulate matter (which is a positive value) discharged from the combustion chambers 12 with execution of fuel injection and an amount of particulate matter (an combustion amount: a negative value) combusted in the particulate filter 240 with execution of fuel cut-off due to release of depression of the accelerator pedal or the like. The amount of discharged particulate matter is derived (estimated) based on the rotation speed Ne or the amount of intake air Qa of the engine 10, the coolant temperature Tw, an integrated amount of intake air ΣQa from start of the engine 10 to stop thereof, and the like. The amount of combusted particulate matter is derived (estimated) based on the amount of deposited particulate matter Dpm, the estimated temperature Tcr1 of the downstream cleaning device 24 (particulate filter 240), the amount of intake air Qa of the engine 10, and the like.

After the process of Step S100, the engine ECU 100 sets a fuel cut-off permission time (FC permission time) tfcref based on the acquired estimated temperature Tcr1 of the particulate filter 240 and the amount of deposited particulate matter Dpm (Step S110). The fuel cut-off permission time tfcref is a time in which the particulate filter 240 is not overheated even if fuel cut-off continues to be performed, where the temperature of the particulate filter 240 is Tcr1 and the amount of deposited particulate matter is Dpm. In Step S110, the engine ECU 100 derives the fuel cut-off permission time tfcref corresponding to the estimated temperature Tcr1 and the amount of deposited particulate matter Dpm from a map which is not illustrated. The map is prepared in advance by experiment and analysis such that the fuel cut-off permission time tfcref decreases as the amount of deposited particulate matter Dpm increases and the fuel cut-off permission time tfcref decreases as the estimated temperature Tcr1 increases.

Subsequently, the engine ECU 100 determines whether the fuel cut-off elapsed time acquired in Step S100 is equal to or less than the fuel cut-off permission time tfcref set in Step S110 (Step S120). When it is determined that the fuel cut-off elapsed time is equal to or less than the fuel cut-off permission time tfcref (Step S120: YES), the engine ECU 100 considers that there is no concern of the particulate filter 240 being overheated even if fuel cut-off continues to be performed, permits execution (sustainment) of fuel cut-off (Step S130), and temporarily ends the routine illustrated in FIG. 5. On the other hand, when it is determined that the fuel cut-off elapsed time is greater than the fuel cut-off permission time tfcref (Step S120: NO), the engine ECU 100 considers that there is concern of the particulate filter 240 being overheated when fuel cut-off continues to be performed, prohibits execution (sustainment) of fuel cut-off (Step S140), and temporarily ends the routine illustrated in FIG. 5.

In this way, by permitting fuel cut-off of the engine 10 in a range of the fuel cut-off permission time tfcref based on the estimated temperature Tcr1 and the amount of deposited particulate matter Dpm of the particulate filter 240, it is possible to reliably curb clogging of the particulate filter 240 by combusting particulate matter while curbing overheating of the particulate filter 240. When fuel cut-off is prohibited in Step S140 in a state in which depression of the accelerator pedal is released, the engine ECU 100 controls the throttle valve 17 such that the amount of intake air Qa reaches a predetermined minimum amount of intake air and controls the plurality of fuel injection valves 20 such that an amount of fuel corresponding to the minimum amount of intake air is injected. Accordingly, the engine 10 rotates at a rotation speed (for example, an idling rotation speed) corresponding to the minimum amount of intake air without outputting a driving force (a torque) greater than a travel resistance.

An abnormality determining process for the upstream cleaning device 23 in the engine 10 will be described below with reference to FIG. 6. FIG. 6 is a flowchart illustrating an abnormality determining routine which is repeatedly performed at intervals of a predetermined time by the engine ECU 100 while the system of the vehicle in which the engine 10 is mounted is operating. In this embodiment, the engine ECU 100 performs active air-fuel ratio control for changing an amount of stored oxygen of the exhaust gas cleaning catalyst 230 between zero and a maximum amount of stored oxygen by forcibly and alternately changing an air-fuel ratio of exhaust gas flowing into the exhaust gas cleaning catalyst 230 between a lean side and a rich side in order to determine whether an abnormality has occurred in the upstream cleaning device 23.

When the routine illustrated in FIG. 6 is started, the engine ECU 100 acquires data required for abnormality determination such as the estimated temperature Tcf2 of the upstream cleaning device 23, the estimated temperature Tcr2 of the downstream cleaning device 24, a flow rate of exhaust gas in the exhaust pipe 22, and an atmospheric pressure Pout detected by the atmospheric pressure sensor 29 (Step S200). The estimated temperatures Tcf2 and Tcr2 are separately estimated by performing the routine illustrated in FIG. 4, and the flow rate of exhaust gas is separately derived based on the amount of intake air Qa. After the process of Step S200, the engine ECU 100 determines whether the acquired estimated temperature Tcf2 of the upstream cleaning device 23 is equal to or greater than a predetermined threshold value Tcf2act (for example, about 600° C.) (Step S210). The threshold value Tcf2act is for determining whether the exhaust gas cleaning catalyst 230 of the upstream cleaning device 23 is activated and is determined in advance based on an activation temperature of the exhaust gas cleaning catalyst 230.

When it is determined that the estimated temperature Tcf2 of the upstream cleaning device 23 is equal to or greater than the threshold value Tcf2act (Step S210: YES), the engine ECU 100 determines whether the estimated temperature Tcr2 of the downstream cleaning device 24 acquired in Step S200 is equal to or greater than a predetermined threshold value Tcr2act (for example, about 450° C.) (Step S220). The threshold value Tcr2act is for determining whether a catalyst carried in the particulate filter 240 of the downstream cleaning device 24 is activated and is determined in advance based on an activation temperature of the catalyst. When it is determined that the estimated temperature Tcr2 of the downstream cleaning device 24 is equal to or greater than the threshold value Tcr2act (Step S220: YES), the engine ECU 100 determines whether another execution condition of the active air-fuel ratio control associated with the flow rate of exhaust gas, the atmospheric pressure Pout, or the like acquired in Step S200 is satisfied (Step S230).

When all the determination results of Steps S210, S220, and S230 are positive (Step S230: YES), the engine ECU 100 performs active air-fuel ratio control (Step S240). In Step S240, the engine ECU 100 sets a target value of the air-fuel ratio of exhaust gas flowing into the upstream cleaning device 23, that is, the air-fuel ratio detected by the upstream air-fuel ratio sensor 22f, to a predetermined lean air-fuel ratio, and sets the target value of the air-fuel ratio detected by the upstream air-fuel ratio sensor 22f to a predetermined rich air-fuel ratio when the air-fuel ratio detected by the downstream air-fuel ratio sensor 22r provided downstream from the upstream cleaning device 23 reaches a lean-determination air-fuel ratio which is greater (leaner) than a stoichiometric air-fuel ratio. In Step S240, the engine ECU 100 sets the target value of the air-fuel ratio detected by the upstream air-fuel ratio sensor 22f to the lean air-fuel ratio when the air-fuel ratio detected by the downstream air-fuel ratio sensor 22r provided downstream from the upstream cleaning device 23 reaches a rich-determination air-fuel ratio which is less (richer) than the stoichiometric air-fuel ratio. Then, in Step S240, the engine ECU 100 performs change of the target value by a predetermined number of times.

In Step S240, the engine ECU 100 calculates an amount of oxygen (an amount of stored oxygen) stored by the exhaust gas cleaning catalyst 230 of the upstream cleaning device 23 while the target value is set to the lean air-fuel ratio using a predetermined calculational expression. The engine ECU 100 calculates an amount of oxygen (an amount of discharged oxygen) discharged by the exhaust gas cleaning catalyst 230 of the upstream cleaning device 23 while the target value is set to the rich air-fuel ratio using a predetermined calculational expression. In this embodiment, the target value of the air-fuel ratio detected by the upstream air-fuel ratio sensor 22f is set to the lean air-fuel ratio and the rich air-fuel ratio by a plurality of times (for example, six times) for each air-fuel ratio, and the amount of stored oxygen and the amount of discharged oxygen are calculated to correspond to the plurality of times. With execution of the active air-fuel ratio control, NOx flowing out from the upstream cleaning device 23 is cleaned by the catalyst carried in the particulate filter 240 of the activated downstream cleaning device 24 and unused fuel flowing out from the upstream cleaning device 23 is combusted in the downstream cleaning device 24.

After the active air-fuel ratio control has been performed, the engine ECU 100 calculates an index Cmax (a maximum amount of stored oxygen) indicating an oxygen storage capacity of the exhaust gas cleaning catalyst 230 of the upstream cleaning device 23 by averaging the plurality of amounts of stored oxygen and the plurality of amounts of discharged oxygen (Step S250). The engine ECU 100 determines whether the index Cmax calculated in Step S250 is less than a predetermined threshold value Cref (Step S260). The threshold value Cref used in Step S260 is a value that is determined based on a lower limit of the maximum amount of stored oxygen of the exhaust gas cleaning catalyst 230 which is considered to be normal. When it is determined that the index Cmax is less than the threshold value Cref (Step S260: YES), the engine ECU 100 considers that an abnormality such as thermal determination has occurred in the exhaust gas cleaning catalyst 230 of the upstream cleaning device 23, turns on an alarm lamp (not illustrated) provided on an instrument panel (not illustrated) of the vehicle (Step S270), and temporarily ends the routine illustrated in FIG. 6.

When it is determined that the index Cmax is equal to or greater than the threshold value Cref (Step S260: NO), the engine ECU 100 considers that the exhaust gas cleaning catalyst 230 of the upstream cleaning device 23 is normal and temporarily ends the routine illustrated in FIG. 6 without performing the process of Step S260. When the determination result of one of Steps S210 to S230 is negative, the engine ECU 100 temporarily ends the routine illustrated in FIG. 6 without performing the processes of Step S240 and steps subsequent thereto.

As described above, the engine ECU 100 that controls the engine 10 determines whether fuel cut-off can be continuously performed regardless of the state of the downstream cleaning device, that is, without heating the particulate filter 240, based on the estimated temperature Tcr1 of the downstream cleaning device 24 estimated from the temperature Teg of exhaust gas detected between the upstream cleaning device 23 and the downstream cleaning device 24 by the exhaust gas temperature sensor 22t and the amount of deposited particulate matter Dpm (Steps S100 to S120 in FIG. 5). Accordingly, it is possible to appropriately ascertain the state of the downstream cleaning device 24 based on the estimated temperature Tcr1 which is accurately derived (estimated) from the temperature Teg of exhaust gas detected at a position relatively close to the downstream cleaning device 24 by the engine ECU 100 (a first temperature estimating unit) that performs the routine illustrated in FIG. 3. Accordingly, in the engine 10, it is possible to appropriately determine whether fuel cut-off for regenerating the particulate filter 240 of the downstream cleaning device 24 is to be performed and to reliably curb clogging of the particulate filter 240 by combusting particulate matter while curbing overheating of the downstream cleaning device 24.

By performing the routine illustrated in FIG. 4, the engine ECU 100 (a second temperature estimating unit) derives (estimates) the estimated temperature Tcf2 of the upstream cleaning device 23 and the estimated temperature Tcr2 of the downstream cleaning device 24 without using the temperature Teg of exhaust gas detected by the exhaust gas temperature sensor 22t. The engine ECU 100 performs active air-fuel ratio control (Step S240) for determining an abnormality in the upstream cleaning device 23 based on the premise that the estimated temperature Tcf2 of the upstream cleaning device 23 derived by performing the routine illustrated in FIG. 4 is equal to or greater than the threshold value (a first lower-limit temperature) Tcfact and the estimated temperature Tcr2 of the downstream cleaning device 24 derived by performing the routine illustrated in FIG. 4 is equal to or greater than the threshold value (a second lower-limit temperature) Tcract (Steps S200 to S230 in FIG. 6).

That is, when the exhaust gas cleaning catalyst 230 of the upstream cleaning device 23 in the engine 10 has deteriorated, the temperature of the upstream cleaning device 23 decreases and thus the temperature Teg of exhaust gas detected (measured) by the exhaust gas temperature sensor 22t between the upstream cleaning device 23 and the downstream cleaning device 24 also decreases in comparison with a case in which the exhaust gas cleaning catalyst 230 has not deteriorated. Accordingly, when whether the active air-fuel ratio control (the abnormality determining process) is to be performed is determined based on the estimated temperature Tcr2 of the downstream cleaning device 24 estimated from the temperature Teg of exhaust gas detected by the exhaust gas temperature sensor 22t, there is concern that the downstream cleaning device 24 is considered not to be activated because the estimated temperature Tcr2 is less than the threshold value Tcract and the active air-fuel ratio control would not be performed even if an abnormality has occurred in the upstream cleaning device 23 (the exhaust gas cleaning catalyst 230). For example, it is conceivable that the temperature of the upstream cleaning device 23 is estimated using the temperature Teg of exhaust gas detected by the exhaust gas temperature sensor 22t. In this case, since the estimated temperature of the upstream cleaning device 23 also decreases with a decrease of the temperature Teg of exhaust gas due to deterioration of the exhaust gas cleaning catalyst 230, there is concern that the estimated temperature is less than the threshold value Tcfact and the active air-fuel ratio control would not be performed.

In consideration of this, the engine ECU 100 determines whether the active air-fuel ratio control is to be performed based on the estimated temperatures Tcf2 and Tcr2 of the upstream cleaning device 23 and the downstream cleaning device 24 estimated without using the temperature Teg of exhaust gas detected by the exhaust gas temperature sensor 22t (Steps S200 to S220 in FIG. 6). When it is determined at least in Step S220 that the estimated temperature Tcr2 of the downstream cleaning device 24 is equal to or greater than the threshold value Tcr2act, the engine ECU 100 performs the active air-fuel ratio control (the abnormality determining process) (Step S240). Accordingly, since whether the active air-fuel ratio control is to be performed can be determined based on the estimated temperatures Tcf2 and Tcr2 in which deterioration of the exhaust gas cleaning catalyst 230 of the upstream cleaning device 23 is not reflected, it is possible to prevent the execution conditions (Steps S210 and S220) of the active air-fuel ratio control from not being satisfied due to deterioration of the exhaust gas cleaning catalyst 230. Accordingly, it is possible to satisfactorily secure opportunities to perform the active air-fuel ratio control and to reliably ascertain the state of the upstream cleaning device 23. As a result, in the engine 10 controlled by the engine ECU 100, it is possible to appropriately perform both determining an abnormality of the exhaust gas cleaning catalyst 230 of the upstream cleaning device 23 and determining a state of the particulate filter 240 of the downstream cleaning device 24.

The engine ECU 100 derives the estimated temperatures Tcf2 and Tcr2 of the upstream cleaning device 23 and the downstream cleaning device 24 based on the input gas temperature Tti which is the temperature of exhaust gas flowing out from the exhaust port of the engine 10, the amount of heat transmitted between the exhaust gas and the exhaust pipe 22, and the amount of heat discharged from the exhaust pipe 22 (FIG. 4). More specifically, the engine ECU 100 derives (estimates) the estimated temperature Tcf2 of the upstream cleaning device 23 based on the output gas temperature Tto which is the temperature of exhaust gas flowing out from the turbine wheel 31 of the supercharger 30 estimated based on the input gas temperature Tti which is the temperature of exhaust gas flowing out from the exhaust port, the amount of heat transmitted between exhaust gas and the exhaust pipe 22 from the turbine wheel 31 to the upstream cleaning device 23, and the amount of heat discharged from the exhaust pipe 22. The engine ECU 100 derives the estimated temperature Tcr2 of the downstream cleaning device 24 based on the estimated temperature Tcf2 of the upstream cleaning device 23, the amount of heat transmitted between exhaust gas and the exhaust pipe 22 from the upstream cleaning device 23 to the downstream cleaning device 24, and the amount of heat discharged from the exhaust pipe 22. Accordingly, since whether the active air-fuel ratio control is to be performed can be determined based on the estimated temperatures Tcf2 and Tcr2 of the upstream cleaning device 23 and the downstream cleaning device 24 which are estimated based on the premise that the upstream cleaning device 23 has not deteriorated, it is possible to reliably secure opportunities to perform the active air-fuel ratio control.

In Step S210, it may be further determined whether the estimated temperature Tcf2 of the upstream cleaning device 23 is equal to or less than a predetermined first upper-limit temperature in Step S220 or it may be further determined whether the estimated temperature Tcr2 of the downstream cleaning device 24 is equal to or less than a predetermined second upper-limit temperature. The abnormality determining process for the upstream cleaning device 23 is not limited to the active air-fuel ratio control, and may be another process including a condition that the upstream cleaning device 23 and the downstream cleaning device 24 are activated as an execution condition. The engine 10 may be a V engine in which the upstream cleaning device 23 and the downstream cleaning device 24 are provided for each bank or may be a natural intake engine not including the supercharger 30. The engine 10 to which the engine ECU 100 is applied may be a diesel engine, an LPG engine, or a hydrogen engine. The vehicle in which the engine 10 is mounted may be a vehicle in which only the engine 10 is used as a power source or may be a hybrid vehicle.

The present disclosure is not limited to the aforementioned embodiment, and can be modified in various forms within a range of extension of the present disclosure. The embodiment is only a specific example of the disclosure described in the SUMMARY and does not limit the elements of the disclosure described in the SUMMARY.

The present disclosure is applicable to production industries for internal combustion engines and the like.

What is claimed is:

1. A control device for an internal combustion engine including an upstream cleaning device and a downstream cleaning device that are provided in an exhaust gas passage and a temperature sensor configured to detect a temperature of exhaust gas between the upstream cleaning device and the downstream cleaning device, the control device comprising:

a processor configured to
  estimate a temperature of the downstream cleaning device without using the temperature of exhaust gas detected by the temperature sensor;
  estimate a temperature of the upstream cleaning device without using the temperature of exhaust gas detected by the temperature sensor; and
  in response to (i) the estimated temperature of the upstream cleaning device being equal to or higher than a predetermined first lower-limit temperature and (ii) the estimated temperature of the downstream cleaning device being equal to or higher than a predetermined second lower-limit temperature, perform an abnormality determining process for the upstream cleaning device,
wherein the processor is configured to estimate the temperature of the downstream cleaning device and the temperature of the upstream cleaning device based on a temperature of exhaust gas flowing out of an exhaust port of the internal combustion engine, an amount of heat transmitted between exhaust gas and an exhaust pipe, and an amount of heat discharged from the exhaust pipe.

2. The control device according to claim 1,
wherein the internal combustion engine further includes
  a supercharger including (i) a turbine wheel that is provided in the exhaust gas passage and (ii) a compressor wheel that is connected to the turbine wheel via a turbine shaft and provided in an intake air passage of the internal combustion engine, and
wherein the processor is configured to
  estimate the temperature of the upstream cleaning device based on
    a temperature of exhaust gas flowing out of the turbine wheel estimated based on the temperature of exhaust gas flowing out of the exhaust port,
    an amount of heat transmitted between exhaust gas and the exhaust pipe from the turbine wheel to the upstream cleaning device, and
    the amount of heat discharged from the exhaust pipe and
  estimate the temperature of the downstream cleaning device based on
    the estimated temperature of the upstream cleaning device,
    an amount of heat transmitted between exhaust gas and the exhaust pipe from the upstream cleaning device to the downstream cleaning device, and
    the amount of heat discharged from the exhaust pipe.

3. The control device according to claim 1,
wherein the internal combustion engine further includes an air-fuel ratio sensor that detects an air-fuel ratio of exhaust gas between the upstream cleaning device and the downstream cleaning device,
wherein the abnormality determining process is active air-fuel ratio control for forcibly and alternately switching an air-fuel ratio of exhaust gas flowing into the upstream cleaning device to a rich side or a lean side with change of the air-fuel ratio detected by the air-fuel ratio sensor to the lean side or the rich side, and
wherein the processor is further configured to
  estimate an amount of oxygen stored and an amount of oxygen discharged by the upstream cleaning device while the active air-fuel ratio control is being performed, and determine whether an abnormality in the upstream cleaning device occurs based on the estimated amount of stored oxygen and the estimated amount of discharged oxygen.

4. The control device according to claim 1,
wherein the upstream cleaning device includes a three-way catalyst,
wherein the downstream cleaning device includes a particulate filter, and
wherein the processor is further configured to
estimate a temperature of the downstream cleaning device from the temperature of exhaust gas detected by the temperature sensor, and
determine whether supply of fuel for regenerating the downstream cleaning device is to be stopped based on the temperature estimated from the temperature of exhaust gas detected by the temperature sensor.

5. A control method for an internal combustion engine including an upstream cleaning device and a downstream cleaning device that are provided in an exhaust gas passage and a temperature sensor that detects a temperature of exhaust gas between the upstream cleaning device and the downstream cleaning device, the control method comprising:

estimating a temperature of the downstream cleaning device without using the temperature of exhaust gas detected by the temperature sensor;
estimating a temperature of the upstream cleaning device without using the temperature of exhaust gas detected by the temperature sensor; and
in response to (i) the estimated temperature of the upstream cleaning device being equal to or higher than a predetermined first lower-limit temperature and (ii) the estimated temperature of the downstream cleaning device being equal to or higher than a predetermined second lower-limit temperature, performing an abnormality determining process for the upstream cleaning device,
wherein the temperature of the downstream cleaning device and the temperature of the upstream cleaning device are estimated based on a temperature of exhaust gas flowing out of an exhaust port of the internal combustion engine, an amount of heat transmitted between exhaust gas and an exhaust pipe, and an amount of heat discharged from the exhaust pipe.

* * * * *